United States Patent Office 3,787,401
Patented Jan. 22, 1974

3,787,401
NOVEL 1,2-BENZOTHIAZINE DIOXIDES
Chris Royce Rasmussen, Ambler, Pa., assignor to
McNeil Laboratories, Inc.
No Drawing. Filed Oct. 2, 1972, Ser. No. 294,120
Int. Cl. C07d 93/02
U.S. Cl. 260—243 R    6 Claims

ABSTRACT OF THE DISCLOSURE

The compounds herein are 1,2,3,4 - tetrahydro - 11-hydroxypyrazino[1,2-b] - 1,2 - benzothiazin - 1(2H) - one 6,6-dioxides, useful for their pharmacological properties and as precursors for useful compounds.

DESCRIPTION OF THE INVENTION

This invention relates to novel 1,2,3,4-tetrahydro - 11-hydroxypyrazino[1,2-b] - 1,2 - benzothiazin - 1(2H) - one 6,6-dioxides and, more particularly, to those having the following formula:

(I)

wherein R is a member selected from the group consisting of hydrogen, loweralkyl, and $CH_2CH_2R_1$, wherein $R_1$ is a member selected from the group consisting of phenyl, cyano, and carboxyl. As used herein, "loweralkyl" means a straight or branched chain saturated aliphatic hydrocarbon containing from 1 to about 5 carbon atoms such as, for example, methyl, ethyl, propyl, isopropyl, pentyl, and the like.

The compounds of Formula I, except where $$R=CH_2CH_2COOH,$$

are prepared by reacting ethyl 4-hydroxy-2H-1,2-benzothiazine-3-carboxylate 1,1-dioxide (II) with an appropriate aziridine of Formula III in which R is as previously defined. This reaction is conducted in a suitable organic solvent such as, for example, an ether, e.g., ethyl ether, dioxane, tetrahydrofuran, and the like; a lower alkanol, e.g. methanol, ethanol, isopropanol, and the like; dimethabout 100° C. may be employed, with reflux generally ylformamide; and the like. Temperatures from ambient to preferred. This reaction may be illustrated by the following:

(II)    (III)

The compound of Formula I where $R=CH_2CH_2COOH$ is prepared by nitrile-to-acid hydrolysis of the compound of Formula I where $R=CH_2CH_2CN$. This reaction may be illustrated by the following:

The subject Compounds I, other than when $$R=CH_2CH_2CN,$$

have been found to possess useful pharmacological properties indicative of central nervous system depressant activity as demonstrated by the following symptoms: ataxia or a decrease in either motor activity or muscle tone. For example, a decrease in motor activity is observed when R=loweralkyl at an intraperitoneal (i.p.) dose of about 300 mg./kg. body weight in the mouse, and decreased muscle tone is observed when $R=CH_2CH_2COOH$ at an i.p. dose of from about 10 to about 100 mg./kg. body weight in the rat. Further, ataxia is observed when $R=H$ or $CH_2CH_2C_6H_5$ at oral doses of about 100 and about 300 mg./kg. body weight, respectively, in the mouse.

The subject Compound I wherein $R=CH_2CH_2CN$ is useful as a precursor in the synthesis of the compound of Formula I where $R=CH_2CH_2COOH$.

The following examples are intended to illustrate, but not to limit, the scope of the present invention.

EXAMPLE I 1,2,3,4-tetrahydro-11-hydroxypyrazino[1,2-b]1,2-benzothiazin-1(2H)-one 6,6-dioxide A solution of 26.92 g. (0.10 mole) of ethyl 4-hydroxy-2H-1,2-benzothiazine-3-carboxylate 1,2-dioxide and 8.6 g. (0.20 mole) of aziridine in 110 ml. of absolute ethanol is heated under reflux for 1.5 hours. The reaction mixture is then allowed to stand at ambient temperatures for about 15 hours, after which time the resulting solid is collected and dried. Recrystallization of this solid from acetone (charcoal) yields, as the desired product, 1,2,3,4-tetrahydro-11-hydroxypyrazino[1,2 - b]1,2 - benzothiazin - 1 (2H)-one 6,6-dioxide, M.P. 262–264° C. (sl. dec.).

*Analysis.*—Calcd. for $C_{11}H_{10}N_2O_4S$ (percent): C, 49.64; H, 3.79; N, 10.52; S, 12.04. Found (percent): C, 49.97; H, 3.85; N, 12.57, 10.76, 10.67; S, 12.28.

EXAMPLE II 1,2,3,4-tetrahydro-2-(β-phenethyl)-11-hydroxypyrazino [1,2-b]-1,2-benzothiazin-1(2H)-one 6,6-dioxide A solution of 13.46 g. (0.050 mole) of ethyl 4-hydroxy-2H-1,2-benzothiazine-3-carboxylate 1,1-dioxide and 11.04 g. (0.075 mole) of N-(β-phenethyl)aziridine in 60 ml. of absolute ethanol is heated under reflux for about 15 hours, and the resulting solid is filtered from the hot solution. Work-up of the mother liquor affords an additional crop of product, which is combined with the first crop and recrystallized from acetone-95% ethanol to yield as pure product, 1,2,3,4-tetrahydro-2-(β-phenethyl)-11-hydroxypyrazino[1,2-b] - 1,2 - benzothiazin-1(2H)-one 6,6-dioxide, M.P. 163.5–165.5° C.

*Analysis.*—Calcd. for $C_{19}H_{18}N_2O_4S$ (percent): C, 61.61; H, 4.90; N, 7.56; S, 8.66. Found (percent): C, 61.53; H, 4.86; N, 7.57; S, 8.65.

EXAMPLE III 2-ethyl-1,2,3,4-tetrahydro-11-hydroxypyrazino[1,2-b]-1,2-benzothiazin-1(2H)-one 6,6-dioxide A solution of 13.46 g. (0.05 mole) of ethyl 4-hydroxy-2H-1,2-benzothiazine-3-carboxylate 1,1-dioxide and 5.33 g. (0.075 mole) of N-ethylaziridine in 60 ml. of absolute ethanol is heated under reflux for 6 hours, after which time it is allowed to stand at ambient temperatures for about 15 hours. The resulting crystals [M.P. (155) 156–158° C.] are collected and are recrystallized from acetone-95% ethanol to yield, as pure product, 2-ethyl-1,2,3,4-tetrahydro-11-hydroxypyrazino-[1,2-b] - 1,2 - benzothiazin-1(2H)-one 6,6-dioxide, M.P. (155) 156–159° C.

*Analysis.*—Calcd. for $C_{13}H_{14}N_2O_4S$ (percent): C, 53.05; H, 4.80; N, 9.52; S, 10.89. Found (percent): C, 52.95; H, 4.81; N, 9.36; S, 10.91.

EXAMPLE IV 2-(2-cyanoethyl)-1,2,3,4-tetrahydro-11-hydroxypyrazino[1,2-b]-1,2-benzothiazin-1(2H)-one 6,6-dioxide To a heated and vigorously stirred solution of 26.92 g. (0.10 mole) of ethyl 4-hydroxy-2H-1,2-benzothiazine-3-carboxylate 1,1-dioxide in 30 ml. of dimethylformamide is added dropwise a solution of 13 g. (0.15 mole) of N-(2-cyanoethyl)aziridine in 40 ml. of dimethylformamide. The reaction mixture is stirred for 15 minutes longer after the addition is complete and is then poured onto 20% hydrochloric acid-ice water. The crystals which form are filtered off, yielding as desired product, 2-(2-cyanoethyl)-1,2,3,4-tetrahydro - 11 - hydroxypyrazino[1,2-b]-1,2-benzothiazin-1(2H)-one 6,6-dioxide, M.P. 190–192° C.

*Analysis.*—Calcd. for $C_{14}H_{13}N_3O_4S$ (percent): C, 52.66; H, 4.10; N, 13.16; S, 10.04. Found (percent): C, 52.63; H, 4.24; N, 13.11; S, 10.03.

EXAMPLE V 1,2,3,4-tetrahydro-11-hydroxy-1-oxopyrazino[1,2-b]-1,2-benzothiazine-2-propionic acid 6,6-dioxide A solution of 20.0 g. (0.06 mole) of 2-(2-cyanoethyl) 1,2,3,4-tetrahydro - 11 - hydroxypyrazino[1,2 - b]-1,2-benzothiazin-1(2H)-one 6,6-dioxide in 250 ml. of glacial acetic acid and 250 ml. of 20% hydrochloric acid is refluxed for 10.5 hours. After the solvent is removed in vacuo, crystals of crude product appear, M.P. 183.5–185° C. Recrystallization of this crude material from ethanol-water yields as pure product, 1,2,3,4-tetrahydro-11-hydroxy - 1 - oxopyrazino[1,2-b]-1,2-benzothiazine-2-propionic acid 6,6-dioxide, M.P. 183–184° C.

*Analysis.*—Calcd. for $C_{14}H_{14}N_2O_6S$ (percent): C, 49.70; H, 4.17; N, 8.28. Found (percent): C, 49.83; H, 4.30; N, 8.46.

What is claimed is:

1. A 1,2,3,4-tetrahydro - 11 - hydroxypyrazino[1,2-b]-1,2-benzothiazin-1(2H)-one 6,6-dioxide having the formula:

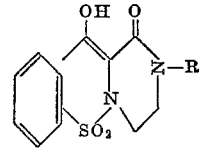

wherein R is a member selected from the group consisting of hydrogen, loweralkyl, β-phenethyl, 2-cyanoethyl, and 2-carboxyethyl.

2. 1,2,3,4-tetrahydro - 11 - hydroxypyrazino[1,2-b]-1,2-benzothiazin-1(2H)-one 6,6-dioxide.

3. 1,2,3,4-tetrahydro-2-(β-phenethyl) - 11 - hydroxypyrazino[1,2-b]-1,2-benzothiazin-1(2H)-one 6,6-dioxide.

4. 2-ethyl-1,2,3,4-tetrahydro - 11 - hydroxypyrazino-[1,2-b]-1,2-benzothiazin-1(2H)-one 6,6-dioxide.

5. 2-(2-cyanoethyl)-1,2,3,4-tetrahydro - 11 - hydroxypyrazino[1,2-b]-1,2-benzothiazin-1(2H)-one 6,6-dioxide.

6. 1,2,3,4-tetrahydro - 11 - hydroxy-1-oxopyrazino[1,2-b]-1,2-benzothiazine-2-propionic acid 6,6-dioxide.

References Cited

UNITED STATES PATENTS 3,408,347   10/1968   Shavel et al. ———— 260—243

JOHN M. FORD, Primary Examiner

U.S. Cl. X.R.

424—246

PO-1050
(5/69)

UNITED STATES PATENT OFFICE
CERTIFICATE OF CORRECTION

Patent No. 3,787,401   Dated January 22, 1974

Inventor(s) Chris Royce Rasmussen

It is certified that error appears in the above-identified patent and that said Letters Patent are hereby corrected as shown below:

In Column 1, lines 48-51, "dimeth-about 100°C." should read --- dimethyl-formamide; and the like. Temperatures from ambient to about 100°C. may be employed, with reflux generally preferred. ---.

In Column 2, line 46, "1,2-dioxide" should read --- 1,1-dioxide ---.

Signed and sealed this 11th day of June 1974.

SEAL)
ttest:

DWARD M. FLETCHER, JR.
ttesting Officer

C. MARSHALL DANN
Commissioner of Patents